(12) United States Patent
Saikyo et al.

(10) Patent No.: US 11,142,204 B2
(45) Date of Patent: Oct. 12, 2021

(54) VEHICLE CONTROL DEVICE AND VEHICLE CONTROL METHOD

(71) Applicant: HONDA MOTOR CO., LTD., Tokyo (JP)

(72) Inventors: Marina Saikyo, Wako (JP); Hiroshi Miura, Wako (JP); Toshifumi Suzuki, Wako (JP); Suguru Yanagihara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 16/281,697

(22) Filed: Feb. 21, 2019

(65) Prior Publication Data

US 2019/0263411 A1   Aug. 29, 2019

(30) Foreign Application Priority Data

Feb. 23, 2018   (JP) .............................. JP2018-030364

(51) Int. Cl.
*B60W 30/18* (2012.01)
*G05D 1/02* (2020.01)
(52) U.S. Cl.
CPC ..... *B60W 30/18163* (2013.01); *G05D 1/0214* (2013.01); *B60W 2554/80* (2020.02); *G05D 2201/0213* (2013.01)

(58) Field of Classification Search
None
See application file for complete search history.

(56) References Cited

U.S. PATENT DOCUMENTS

| 9,672,734 B1* | 6/2017 | Ratnasingam ....... G08G 1/0968 |
| 10,810,883 B1* | 10/2020 | Rander ............ G08G 1/096827 |
| 2010/0070164 A1 | 3/2010 | Machino |
| 2010/0274473 A1* | 10/2010 | Konishi ............. G01C 21/3697 701/532 |
| 2019/0061765 A1* | 2/2019 | Marden ........... B60W 30/18163 |

FOREIGN PATENT DOCUMENTS

JP              4879346 B2     2/2012

* cited by examiner

*Primary Examiner* — Jonathan M Dager
*Assistant Examiner* — Garrett F Evans
(74) *Attorney, Agent, or Firm* — Carrier Blackman & Associates, P.C.; Joseph P. Carrier; William D. Blackman

(57) ABSTRACT

In a vehicle control device and a vehicle control method, the vehicle control device comprises a lane recognition unit adapted to recognize lane types of a host vehicle lane and an adjacent lane, a control condition setting unit adapted to set first to third control conditions in order to make a lane change depending on the lane types that were recognized by the lane recognition unit, and a vehicle control unit adapted to carry out a lane change control with respect to a host vehicle on the basis of the first to third control conditions set by the control condition setting unit.

11 Claims, 7 Drawing Sheets

VEHICLE CONTROL DEVICE AND VEHICLE CONTROL METHOD

CROSS-REFERENCE TO RELATED APPLICATION

This application is based upon and claims the benefit of priority from Japanese Patent Application No. 2018-030364 filed on Feb. 23, 2018, the contents of which are incorporated herein by reference.

BACKGROUND OF THE INVENTION

Field of the Invention

The present invention relates to a vehicle control device and a vehicle control method, which are adapted to carry out a travel control or an assist control for a host vehicle, on the basis of an output result from at least one device from among a periphery monitoring device that monitors the periphery around the host vehicle, or a position specifying device that specifies a travel position of the host vehicle.

Description of the Related Art

In the United States, in order to alleviate traffic congestion on a freeway connecting urban and suburban regions, locations exist where a single lane or a plurality of lanes on a left side with respect to the direction of travel are set as car pool lanes in which only vehicles that satisfy specified conditions are capable of traveling. In such car pool lanes, emergency vehicles and motorcycles are capable of traveling unconditionally, whereas four-wheeled vehicles are allowed to travel therein if two or three or more people are riding as passengers in the vehicle. In addition, as a part of environmental countermeasures, if a so-called eco car (ecologically friendly car) meets certain criteria, even a four-wheeled vehicle in which a single passenger is riding is capable of traveling in such a car pool lane.

In Japanese Patent No. 4879346, it is disclosed that when an automobile comes into proximity to a car pool lane, visible information such as letters, markings, or an enlarged map or the like which indicate the car pool lane is displayed on a display screen of a navigation device.

SUMMARY OF THE INVENTION

Incidentally, in recent years, an automated driving technique (AD) or a driving assist technique (ADAS, advance driving assistant system), which at least partially carries out a travel control of a host vehicle automatically, is being rapidly developed. For this reason, in the future, cases are also assumed in which such vehicles will be capable of automatically traveling on a freeway.

However, in the technique of the above-described publication, the object thereof is to cause a driver of the vehicle to recognize appropriate information concerning a car pool lane. Therefore, upon entering and using such a car pool lane, no consideration is given as to how to enable the vehicle to smoothly execute automated traveling.

For example, in a road having a plurality of lanes such as a freeway, in the case there is a specified lane such as a car pool lane as well as general lanes in which all vehicles are capable of traveling, the flow of traffic (for example, the traffic volume, traffic density, traffic speed) tend to differ from each other. In this case, between a host vehicle lane in which the host vehicle is currently traveling and an adjacent lane adjacent to the host vehicle lane, no consideration is given in the above-described publication concerning how to enable the host vehicle to change lanes smoothly from the host vehicle lane to the adjacent lane. In addition, not only in the case of making a lane change between different lane types, in the above-describe publication, there is also no consideration given concerning a lane change of the host vehicle between the same lane types.

The present invention has been devised in order to solve the aforementioned problems, and has the object of providing a vehicle control device which is capable of smoothly performing a lane change while taking into consideration a tendency of the flow of traffic.

The present invention concerns a vehicle control device and a vehicle control method, which are adapted to carry out a travel control or an assist control for a host vehicle, on the basis of an output result from at least one device from among a periphery monitoring device that monitors the periphery around the host vehicle, or a position specifying device that specifies a travel position of the host vehicle.

In this case, the vehicle control device comprises a lane recognition unit adapted to recognize lane types of a host vehicle lane in which a host vehicle is traveling and an adjacent lane adjacent to the host vehicle lane, a control condition setting unit adapted to set a control condition for the host vehicle in order to make a lane change from the host vehicle lane to the adjacent lane depending on the lane types that were recognized by the lane recognition unit, and a vehicle control unit adapted to carry out a travel control or an assist control in relation to the lane change on the basis of the control condition set by the control condition setting unit.

Further, a vehicle control method comprises a first step in which a lane recognition unit recognizes lane types of a host vehicle lane in which the host vehicle is traveling and an adjacent lane adjacent to the host vehicle lane, a second step in which a control condition setting unit sets a control condition for the host vehicle in order to make a lane change from the host vehicle lane to the adjacent lane depending on the lane types that were recognized by the lane recognition unit, and a third step in which a vehicle control unit carries out a travel control or an assist control in relation to the lane change on the basis of the control condition set by the control condition setting unit.

In the foregoing manner, even if there is a tendency for the flow of traffic to differ in each of the lanes, the control condition for carrying out the lane change is changed depending on the lane types. Consequently, it becomes possible to smoothly perform a lane change while taking into consideration the tendency of the flow of traffic. As a result, even when the host vehicle travels on a road such as a freeway having a plurality of lanes, the host vehicle is capable of traveling in a stable manner.

Further, the lane types may include a specified lane in which a specified vehicle is capable of traveling in a preferential manner, and a general lane in which all vehicles can travel. The control condition setting unit sets a different control condition in the case that the host vehicle lane or the adjacent lane is the specified lane and the other lane is the general lane, and in the case that both the host vehicle lane and the adjacent lane are the specified lane or the general lane.

In the specified lane such as a car pool lane, the traffic volume is relatively small and the average velocity is relatively high, and therefore, the distance between the vehicles, or in other words, the inter-vehicle distance tends to be relatively long. On the other hand, in the general lane, the traffic volume is relatively large and the average velocity is relatively low, and therefore, the inter-vehicle distance tends to be relatively short. Therefore, by changing the control condition in accordance with the difference between the specified lane and the general lane, even if the tendency of the flow of traffic differs between such lanes, the lane change can be performed smoothly.

Furthermore, the control condition includes a threshold value of a difference between an average velocity of the host vehicle lane and an average velocity of the adjacent lane. In the case that both of the host vehicle lane and the adjacent lane are the specified lane or the general lane, the vehicle control unit performs the travel control or the assist control if the difference in velocity is less than or equal to the threshold value. Further, in the case that among the host vehicle lane or the adjacent lane, one of them is the specified lane, the vehicle control unit performs the travel control or the assist control even when the difference in velocity is in excess of the threshold value.

Accordingly, since the lane change is carried out when the difference in velocity is small between two of the specified lanes or between two of the general lanes, the lane change can be performed smoothly. On the other hand, since the lane change is carried out even in the case there is a certain degree of difference in velocity between the specified lane and the general lane, the lane change can be reliably executed.

Still further, the control condition setting unit may set the control condition in consideration of a remaining distance from a travel position of the host vehicle to an exit of a road including the host vehicle lane and the adjacent lane. In accordance with this feature, it is possible to carry out the lane change in a manner so that the host vehicle can depart from the exit.

In this case, the control condition setting unit may set the control condition in consideration of the remaining distance and the traffic congestion in the vicinity of the exit. In accordance with this feature, if traffic congestion is occurring in the vicinity of the exit, it is possible to carry out the lane change at an early stage.

Further, the control condition setting unit may set the control condition in a manner so that the velocity of the host vehicle is changed depending on the remaining distance when the lane change occurs. In accordance with this feature, in the case that the remaining distance is long, since there is a margin available until the host vehicle reaches the exit, the host vehicle can be gradually decelerated and then execute the lane change. On the other hand, in the case that the remaining distance is short, since sufficient margin is not available for the host vehicle to reach the exit, the host vehicle can be rapidly decelerated and then execute the lane change.

Furthermore, the control condition setting unit may set the control condition in a manner so that an offset amount of the host vehicle from a center position of the host vehicle lane to a side of the adjacent lane is changed depending on the remaining distance when the lane change occurs. In accordance with this feature, it is possible to shorten the time required for the lane change.

Further still, the control condition setting unit may set the control condition in a manner so that, when the host vehicle performs a lane change from the specified lane into the general lane, a certain marginal amount is secured between the host vehicle and another vehicle in front of or behind the host vehicle. In accordance with this feature, the lane change can be executed in a state in which it is assured that there is an inter-vehicle distance or a time to collision (TTC) with the other vehicle traveling in the general lane in front of or behind the host vehicle.

The vehicle control device may further comprise a lane change determining unit adapted to permit the lane change. In this case, after the lane change determining unit has permitted the lane change, recognition of the lane types by the lane recognition unit, setting of the control condition by the control condition setting unit, and the travel control or the assist control by the vehicle control unit may be sequentially carried out. Alternatively, after recognition of the lane types by the lane recognition unit, and setting of the control condition by the control condition setting unit are sequentially carried out, and the lane change determining unit has permitted the lane change, the vehicle control unit may carry out the travel control or the assist control. In either of such cases, the lane change can be performed smoothly and appropriately.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a vehicle control device and a vehicle control method according to the present invention will be presented and described in detail below with reference to the accompanying drawings.

[1. Configuration of Vehicle 12 Including the Vehicle Control Device 10]

<1.1. Outline of Vehicle 12>

Figure 1:
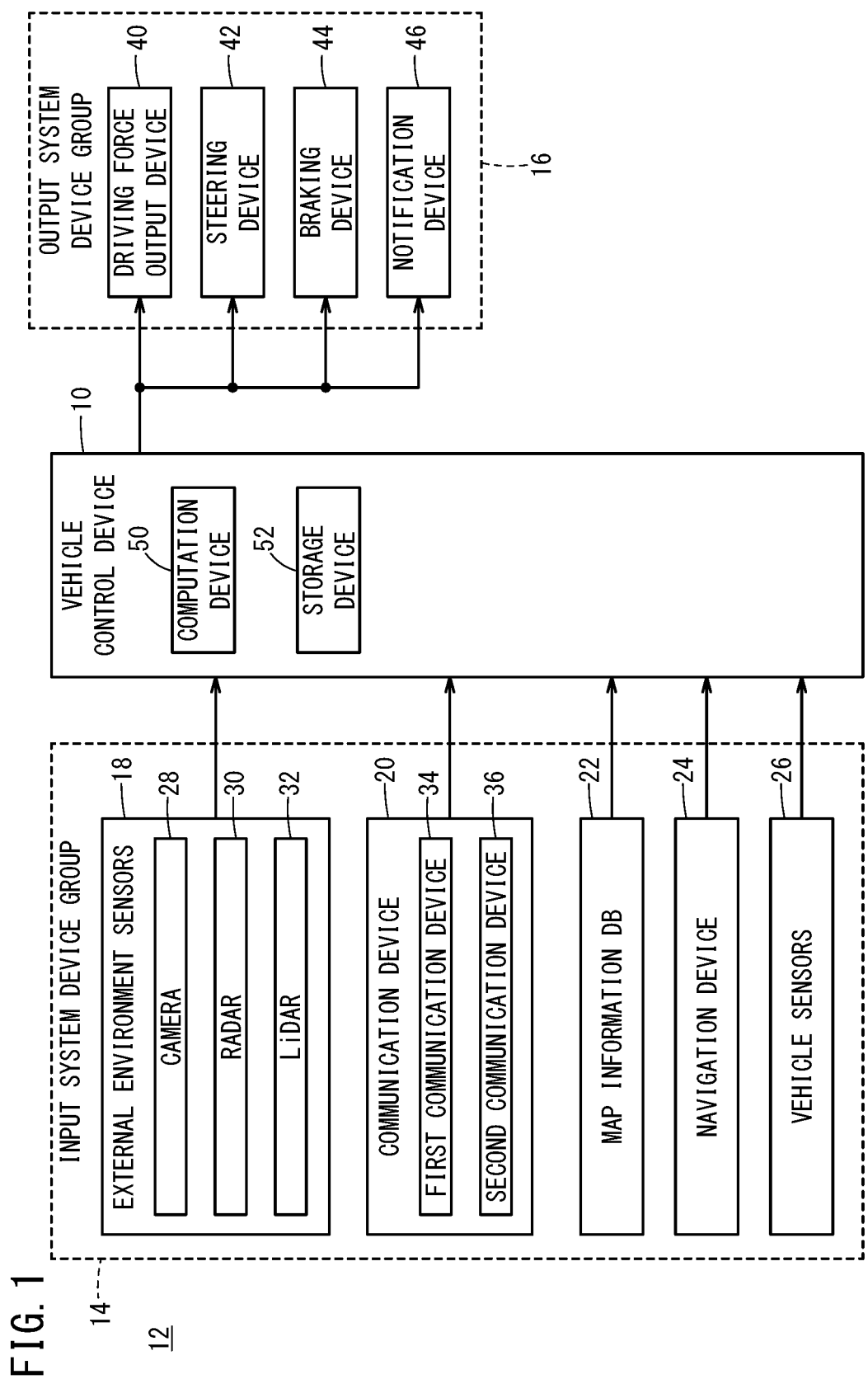
FIG. 1 is a block diagram showing the configuration of a host vehicle in which there is included a vehicle control device according to an embodiment of the present invention.

FIG. 1 is a block diagram showing the configuration of a vehicle 12 (hereinafter referred to as a host vehicle 12) in which there is included a vehicle control device 10 according to an embodiment of the present invention. The vehicle control device 10 is incorporated in the host vehicle (user's own vehicle) 12, and performs a driving control for the host vehicle 12 by way of automated driving or manual driving. Moreover, in the present specification, the term "automated driving" implies a concept that includes not only "fully automated driving" in which the travel control for the host vehicle 12 is performed entirely automatically, but also "partial automated driving" in which the travel control is partially performed automatically.

The host vehicle 12 includes the vehicle control device 10 that oversees the driving control of the host vehicle 12, an input system device group 14 responsible for input functions of the vehicle control device 10, and an output system device group 16 responsible for output functions of the vehicle control device 10.

<1.2. Specific Configuration of Input System Device Group 14>

In the input system device group 14, there are included external environment sensors 18 (periphery monitoring devices) that detect a state of the surrounding vicinity (external environment) around the periphery of the host vehicle 12, a communication device 20 (periphery monitoring device) which carries out transmission and reception of information to and from various communication devices located externally of the host vehicle 12, a high precision map database 22 (hereinafter also referred to as a map information DB (position specifying device) 22) which acquires map information indicative of a high precision map, a navigation device 24 (position specifying device) that generates a travel route to a destination together with measuring the position of the host vehicle 12, and vehicle sensors 26 that detect the state of the host vehicle 12.

Among the external environment sensors 18, there are included one or more cameras 28 for capturing images of the external environment, one or more radar devices 30 that detect the distance and the relative velocity between the host vehicle 12 and another object (for example, another vehicle), and one or more LiDAR (Light Detection and Ranging/Laser Imaging Detection and Ranging) devices 32.

In the communication device 20, there are included a first communication device 34 that performs inter-vehicle communications between the host vehicle 12 and other vehicles, and a second communication device 36 that performs road-to-vehicle communications between the host vehicle 12 and roadside devices. The navigation device 24 includes a satellite navigation system and a self-contained navigation system. Among the vehicle sensors 26, there are included various sensors that detect behaviors of the host vehicle 12, such as a vehicle velocity sensor, an acceleration sensor, a yaw rate sensor, an inclination sensor, and the like, various sensors that detect the state of operation of the host vehicle 12, and various sensors that detect the state of the driver, such as a vehicle interior camera that captures images of the state of the driver of the host vehicle 12.

<1.3. Specific Configuration of Output System Device Group 16>

The output system device group 16 includes a driving force output device 40, a steering device 42, a braking device 44, and a notification device 46.

The driving force output device 40 includes a driving force ECU (Electronic Control Unit), and a drive source including an engine and/or a driving motor. The driving force output device 40 generates a driving force in accordance with an operation of an accelerator pedal performed by the driver, or a driving control instruction output from the vehicle control device 10.

The steering device 42 includes an EPS (electric power steering system) ECU, and an EPS actuator. The steering device 42 generates a steering force in accordance with an operation of the steering wheel performed by the driver, or a steering control instruction output from the vehicle control device 10.

The braking device 44 includes a brake ECU and a brake actuator. The braking device 44 generates a braking force in accordance with an operation of the brake pedal performed by the driver, or a braking control instruction output from the vehicle control device 10.

The notification device 46 includes a notification ECU, and an information transmission device (for example, a display device, an audio device, a haptic device). The notification device 46 issues a notification (for example, providing information through the five senses including the senses of seeing and hearing) with respect to the driver in accordance with a notification instruction output from the vehicle control device 10 or another ECU.

<1.4. Specific Configuration of Vehicle Control Device 10>

The vehicle control device 10 is constituted by one ECU or a plurality of ECUs, and comprises a computation device 50 such as a processor, and a storage device 52 such as a ROM (Read Only Memory) and a RAM (Random Access Memory). The vehicle control device 10 realizes various functions by the computation device 50 executing programs stored in the storage device 52.

Figure 2:
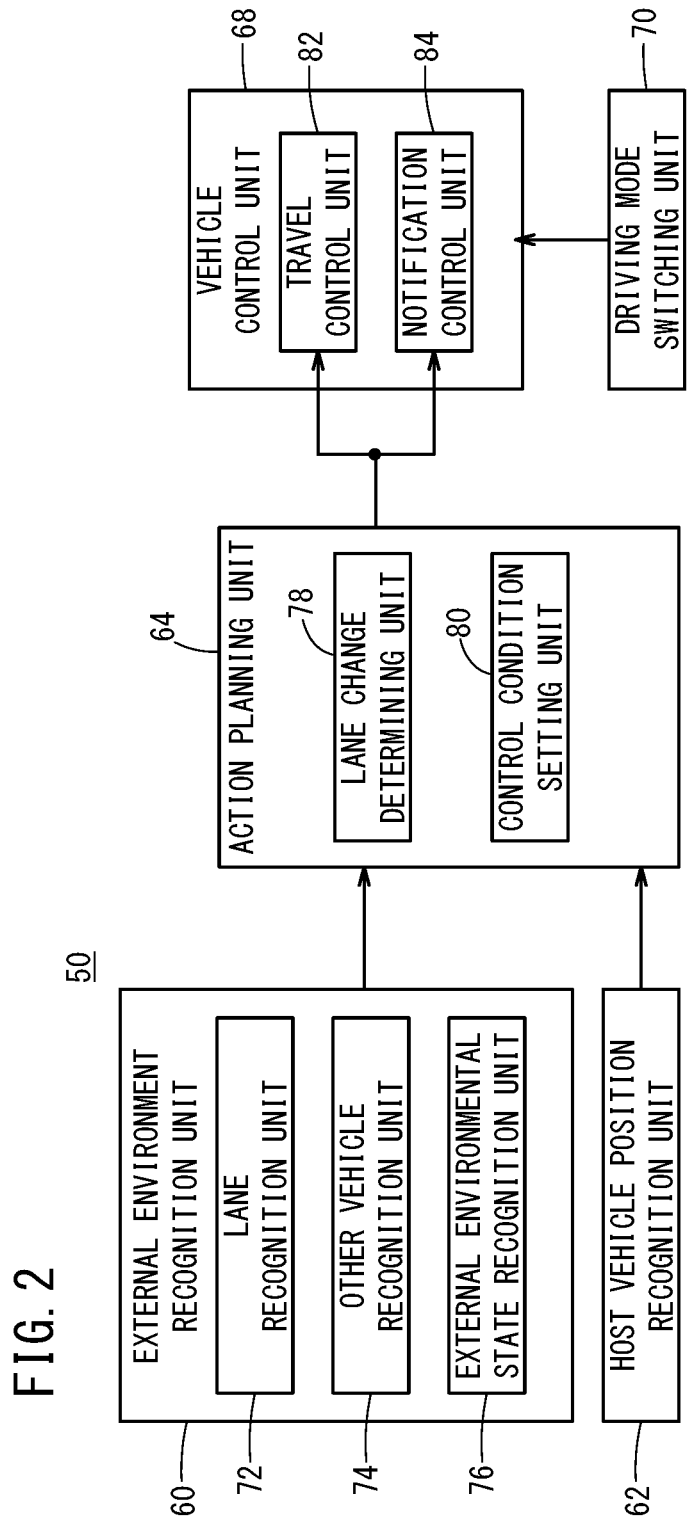
FIG. 2 is a functional block diagram of a computation device shown in FIG. 1.

FIG. 2 is a functional block diagram of the computation device 50 shown in FIG. 1. The computation device 50 is configured to be capable of executing various functions of an external environment recognition unit 60, a host vehicle position recognition unit 62, an action planning unit 64, a vehicle control unit 68, and a driving mode switching unit 70.

On the basis of information output from the external environment sensors 18, the external environment recognition unit 60 recognizes the circumstances and objects in the vicinity around the host vehicle 12. The external environment recognition unit 60 includes a lane recognition unit 72, an other vehicle recognition unit 74, and an external environmental state recognition unit 76.

Based on information output from the map information DB 22 and the navigation device 24, the host vehicle position recognition unit 62 recognizes the absolute position of the host vehicle 12, or the relative position (hereinafter also referred to as the host vehicle position) on the high precision map.

On the basis of the recognition results from the external environment recognition unit 60 and the host vehicle position recognition unit 62, the action planning unit 64 creates action plans (a time series of events for each of respective travel segments) according to the situation of the host vehicle 12, and updates the action plans as needed. Further, on the basis of the aforementioned recognition results, the action planning unit 64 generates travel trajectories (a time series of target behaviors) in accordance with the created action plans. The action planning unit 64 includes a lane change determining unit 78 and a control condition setting unit 80.

The vehicle control unit 68 issues instructions for desired operations with respect to the output system device group 16 (see FIG. 1), on the basis of the action plans or the travel trajectories created by the action planning unit 64. The vehicle control unit 68 includes a travel control unit 82 that carries out a travel control for the host vehicle 12, and a notification control unit 84 that performs a notification control with respect to the driver.

The driving mode switching unit 70 is configured to be capable of switching between a plurality of driving modes including an "automated driving mode" and a "manual driving mode," in accordance with predetermined actions taken by the driver (for example, operation of input devices including switches and the steering wheel).

[2. Operations of Vehicle Control Device 10]

The host vehicle 12 including the vehicle control device 10 according to the present embodiment is configured basically in the manner described above. Next, operations (a vehicle control method) of the vehicle control device 10 at the time of making a lane change on a road including a plurality of lanes will be described primarily with reference to the flowchart of FIG. 3. In this instance, a case will be assumed in which the host vehicle 12, which is equipped with the vehicle control device 10 (see FIG. 1), travels by way of automated driving.

<2.1. Description of Road 100>

Figure 4:
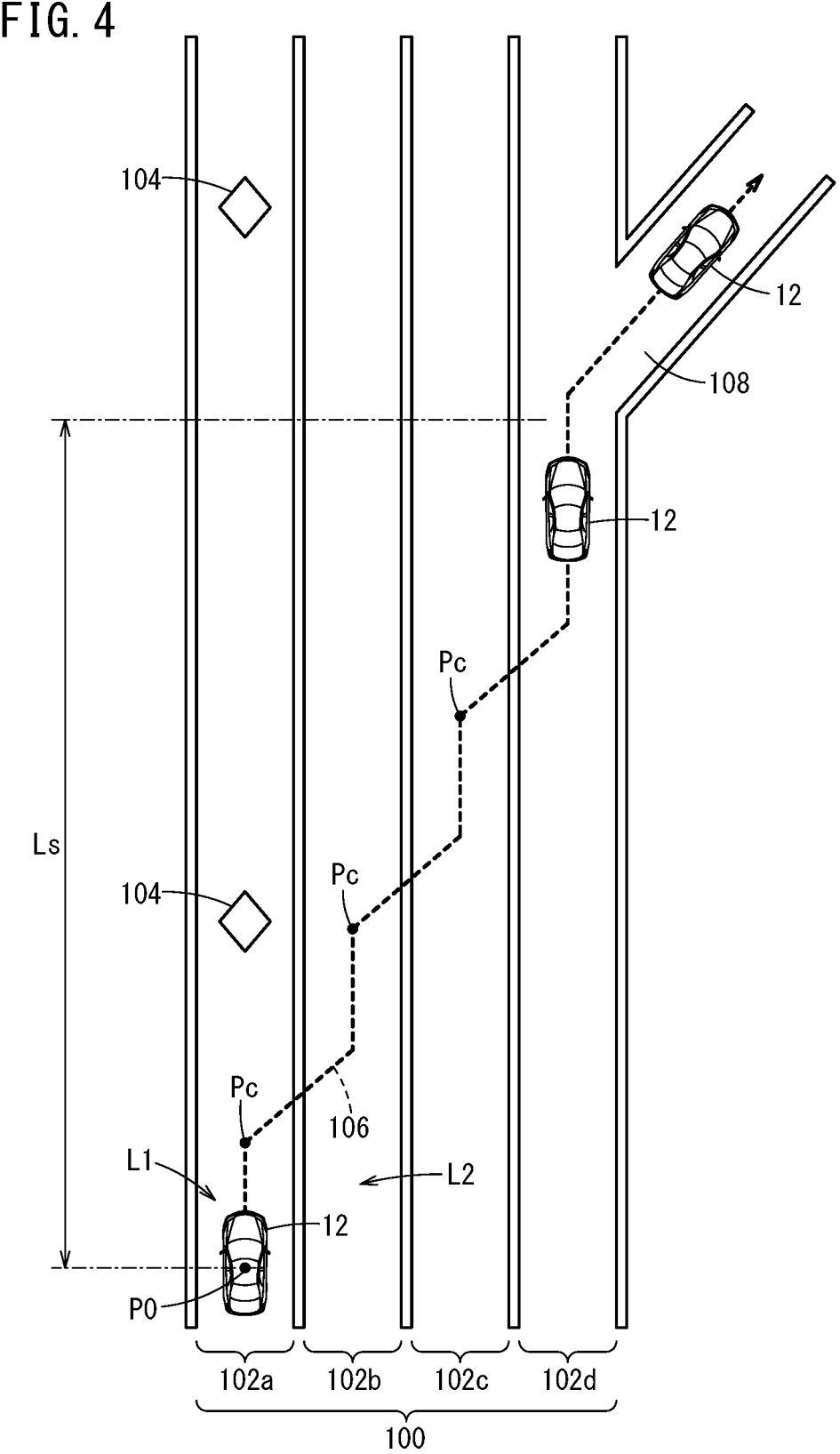
FIG. 4 is a diagram showing a lane change made on a freeway.

FIG. 4 is a diagram showing a travel scenario of the host vehicle 12 on a road 100 that includes a plurality of lanes. The road 100, for example, is a freeway in the United States. On the road 100, four lanes are provided along a travel direction of vehicles including the host vehicle 12. Among the four lanes, the leftmost lane in the travel direction is a car pool lane (specified lane) 102a, and the remaining three lanes are general lanes 102b to 102d. Rhombus shaped road markings 104 which indicate the existence of the car pool lane 102a are provided in the car pool lane 102a.

The car pool lane 102a is a specified lane in which specified vehicles such as an emergency vehicle, a two-wheeled vehicle, a four-wheeled vehicle in which two or three or more people are riding as passengers, or an eco car in which a single person is riding are capable of traveling in a preferential manner. Further, the general lanes 102b to 102d are lanes in which all vehicles are capable of traveling. It should be noted that the car pool lane 102a is made use of as a car pool lane only during a predetermined time period, and all vehicles are capable of traveling therein as a general lane at other time periods.

In this instance, a description will be given concerning a case in which the host vehicle 12 travels while changing lanes along a planned travel route 106 which is indicated by the dashed line on the freeway lanes (the respective lanes 102a to 102d of the road 100), and then the host vehicle 12 exits from an exit 108 of the freeway.

<2.2. Description of Flowchart of FIG. 3>

Figure 3:
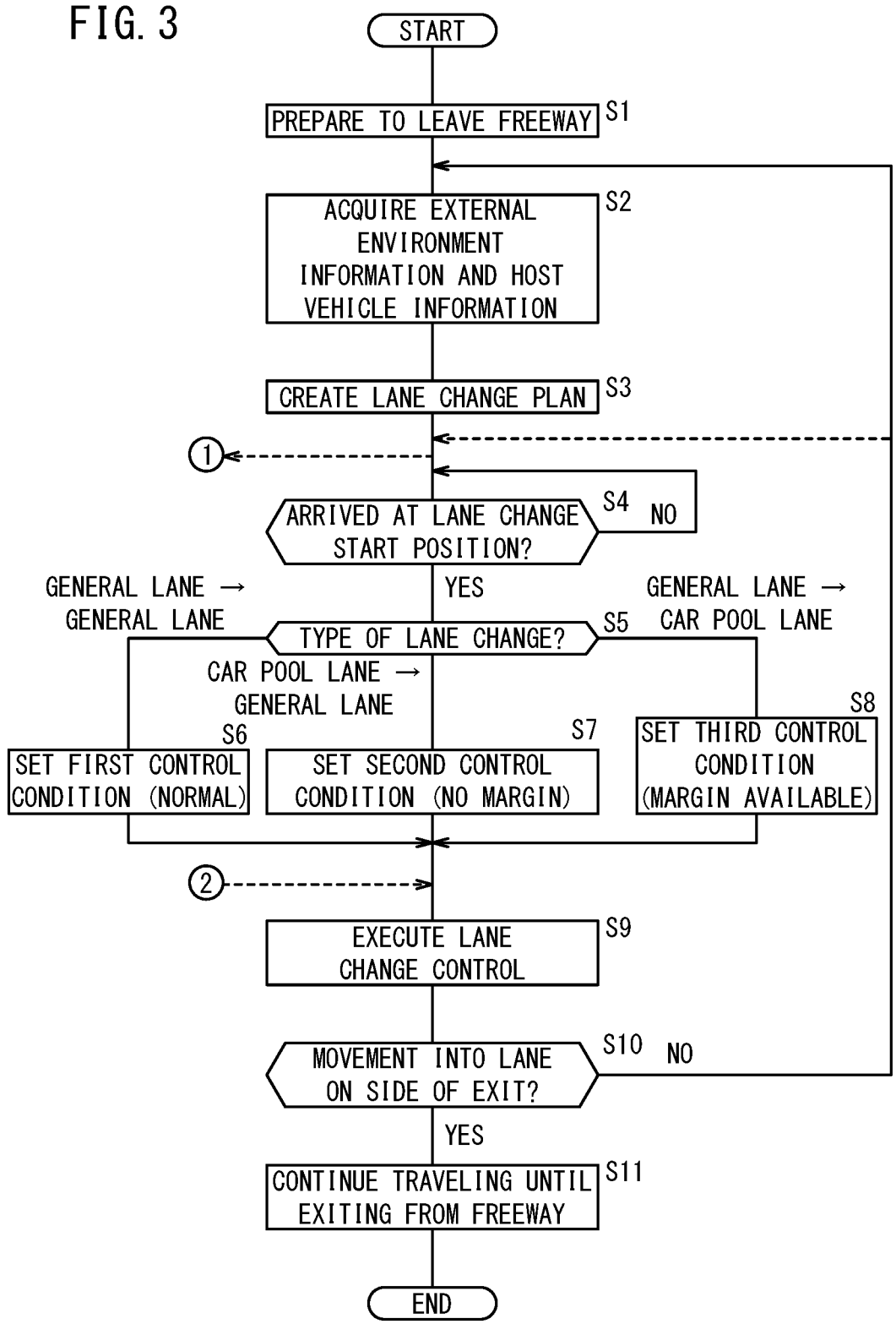
FIG. 3 is a flowchart for describing operations of the computation device shown in FIG. 2.

In the case that the host vehicle 12 (see FIGS. 1 and 4) is traveling in the car pool lane 102a, in step S1 of FIG. 3, the host vehicle 12 starts to make preparations for exiting the freeway (road 100).

In step S2, the vehicle control device 10 (see FIG. 1) acquires information of the external environment and information of the host vehicle 12 which are output from the input system device group 14. In this case, as the information acquired by the vehicle control device 10, there are included, for example, (1) the host vehicle position P0 on the road 100 (see FIG. 4), (2) the planned travel route 106 of the host vehicle 12 from the host vehicle position P0 to the exit 108, (3) a remaining distance Ls from the host vehicle position P0 to the exit 108, (4) the number of lanes of the road 100, (5) traffic congestion information of the road 100, (6) a number of remaining lanes until reaching the exit 108, (7) information concerning the host vehicle lane L1 (see FIGS. 4 to 6) which is the lane in which the host vehicle 12 is traveling, and (8) a difference between an average velocity of vehicles traveling in the host vehicle lane L1 and an average velocity of vehicles traveling in an adjacent lane L2 adjacent to the host vehicle lane L1, and a difference in acceleration corresponding to such a difference in velocity. The vehicle control device 10 may acquire all of such pieces of information, or may acquire only information that is necessary.

More specifically, the host vehicle position recognition unit 62 (see FIG. 2) acquires (recognizes) the host vehicle position P0 and the planned travel route 106 on the basis of the output information of the map information DB 22 and the navigation device 24. Further, the host vehicle position recognition unit 62 specifies the position of the exit 108 on the basis of the output information of the map information DB 22. Consequently, on the basis of the specified position of the exit 108 and the vehicle position P0, the host vehicle position recognition unit 62 is capable of calculating the remaining distance Ls.

For example, based on the image information from the cameras 28 or the map information (high-precision map) read out from the map information DB 22, the external environmental state recognition unit 76 recognizes information concerning the general road environment of the road 100, for example, the shape and width, the number of lanes, and the lane width of the road 100. Further, based on the output information from the second communication device 36, the external environmental state recognition unit 76 acquires (recognizes) traffic congestion information of the road 100. Furthermore, based on the output information from the external environment sensors 18, the communication device 20, and the vehicle sensors 26, the external environmental state recognition unit 76 calculates the difference in acceleration and the difference in velocity of the average velocities of the vehicles between the host vehicle lane L1 and the adjacent lane L2.

For example, on the basis of the image information of the cameras 28 or the map information from the map information DB 22, and the information of the road 100 acquired by the external environmental state recognition unit 76, the lane recognition unit 72 recognizes the lane types of each of the lanes 102a to 102d of the road 100 including the host vehicle lane L1 and the adjacent lane L2. Consequently, in the situation shown in FIG. 4, the lane recognition unit 72 is capable of recognizing that the host vehicle lane L1 is a car pool lane 102a and that the adjacent lane L2 is a general lane 102b. Further, on the basis of the information recognized by the host vehicle position recognition unit 62, the lane recognition unit 72 can specify the number of remaining lanes until reaching the exit 108.

Moreover, in the car pool lane 102a, the traffic volume is relatively small and the average velocity is relatively high, whereas in the general lanes 102b to 102d, the traffic volume is relatively large and the average velocity is relatively low. Therefore, in the case that the lane types of each of the lanes 102a to 102d cannot be recognized by the above-described image information, the map information, or the like, the lane recognition unit 72 may recognize the lane types of each of the lanes 102a to 102d on the basis of the difference between the average velocities.

Further, in step S2, for example, based on the information output from the cameras 28, the radar devices 30, or the LiDAR devices 32, the other vehicle recognition unit 74 can recognize the presence or absence, the position, the size, and the types of the other vehicles (the other vehicles 110f, 110r, etc., shown in FIGS. 5 and 6) which are traveling or stopped around the periphery of the host vehicle 12, and can also calculate the distance and the relative velocity between the host vehicle 12 and the other vehicles. Consequently, when the host vehicle 12 makes a lane change from the host vehicle lane L1 to the adjacent lane L2, the other vehicle recognition unit 74 is capable of calculating inter-vehicle distances Lf, Lr between the host vehicle 12 after the lane change and the other vehicles 110f, 110r in front of and behind the host vehicle 12, as well as the difference in velocity and the difference in acceleration between the host vehicle 12 and the other vehicles 110f, 110r in front of and behind the host vehicle 12.

In addition, in step S3, the action planning unit 64 creates an action plan corresponding to the situation of the host vehicle 12, on the basis of the respective recognition results of the lane recognition unit 72, the other vehicle recognition unit 74, the external environmental state recognition unit 76, and the host vehicle position recognition unit 62. More specifically, a lane change plan is created in a manner so that the host vehicle 12 initiates the lane change on the road 100 at a lane change start position Pc (see FIGS. 4 and 5) on the planned travel route 106. Accordingly, the lane change start position Pc is a position at which the host vehicle 12 initiates a travel control or an assist control (hereinafter also referred to as a "lane change control") in relation to the lane change. Moreover, as shown in FIG. 4, in the case there are a plurality of lanes 102a to 102d, and the planned travel route 106 to the exit 108 is set, lane change start positions Pc are set for each of the lanes.

Figure 5:
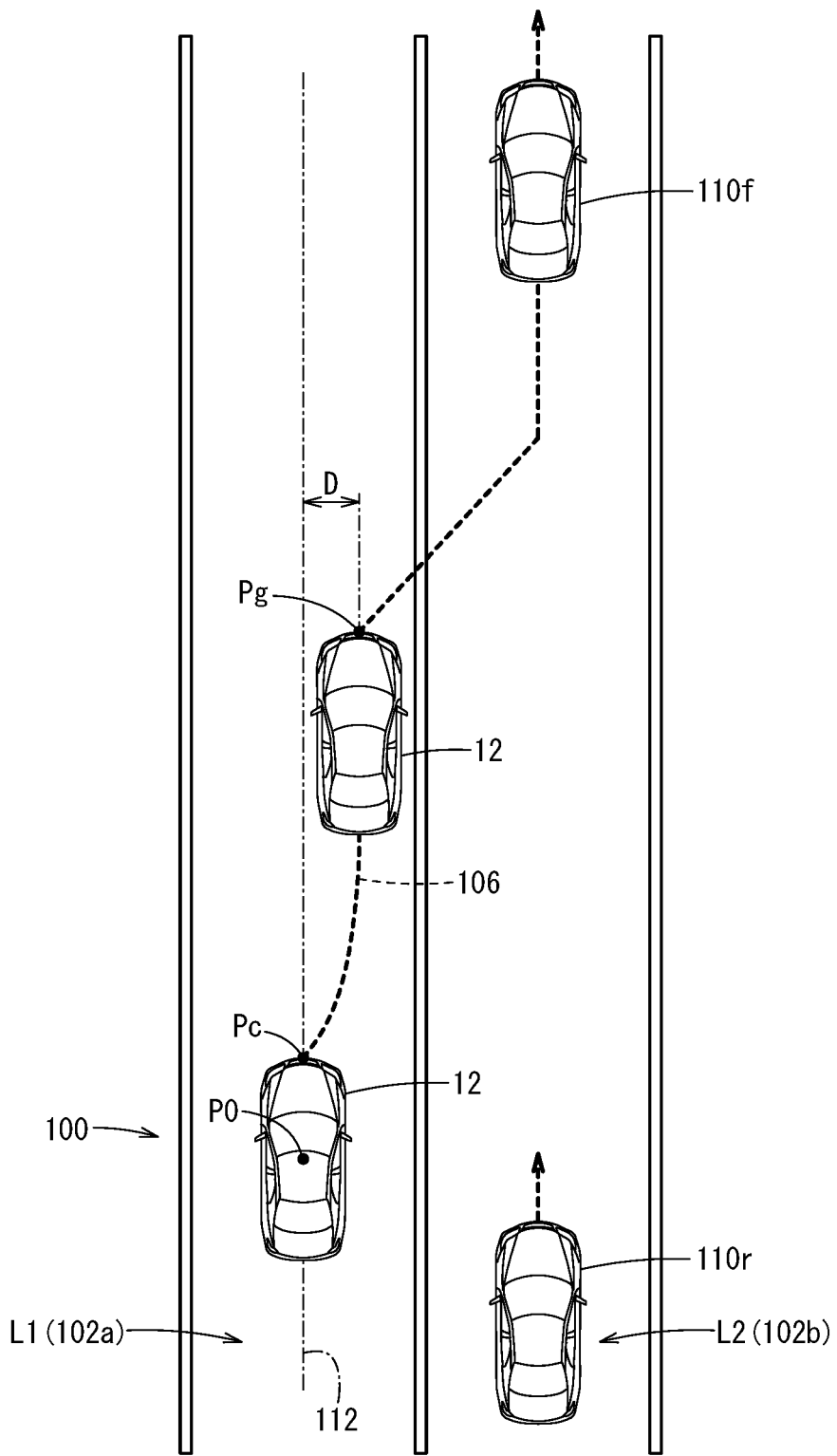
FIG. 5 is a diagram showing the traveling state of the host vehicle before making a lane change.

In step S4, the lane change determining unit 78 determines whether or not the host vehicle 12 has arrived at the lane change start position Pc (see FIGS. 4 and 5). More specifically, in the case that the host vehicle 12 is traveling in the host vehicle lane L1 along the planned travel route 106, the lane change determining unit 78 determines whether or not the host vehicle 12 has reached the lane change start position Pc at which the lane change control from the host vehicle lane L1 to the adjacent lane L2 is started.

In the case that the lane change start position Pc has not yet been reached (step S4: NO), the process remains at step S4 until the host vehicle 12 has reached the lane change start position Pc. On the other hand, in the case that the host vehicle 12 has arrived at the lane change start position Pc (step S4: YES), the lane change determining unit 78 permits the lane change control from the host vehicle lane L1 to the adjacent lane L2, and then the process proceeds to the following step S5.

In step S5 (first step), the control condition setting unit 80 receives the permission for the lane change control from the lane change determining unit 78, and on the basis of the recognition result of the lane recognition unit 72, the control condition setting unit 80 confirms the lane types of the host vehicle lane L1 and the adjacent lane L2. In addition, as shown in the following steps S6 to S8 (second step), the control condition setting unit 80 sets control conditions in relation to the lane change control, in accordance with the lane types of the host vehicle lane L1 and the adjacent lane L2. It should be noted that the control conditions are control parameters utilized when the lane change control in which the host vehicle 12 changes from the host vehicle lane L1 to the adjacent lane L2 is carried out by the vehicle control unit 68. For example, the control parameters include the threshold value for the difference in velocity, the remaining distance Ls, the traffic congestion information at the exit 108, the inter-vehicle distance Lf, Lr after the lane change, and the time to collision TTCf, TTCr in accordance with the inter-vehicle distances Lf, Lr.

Figure 6:
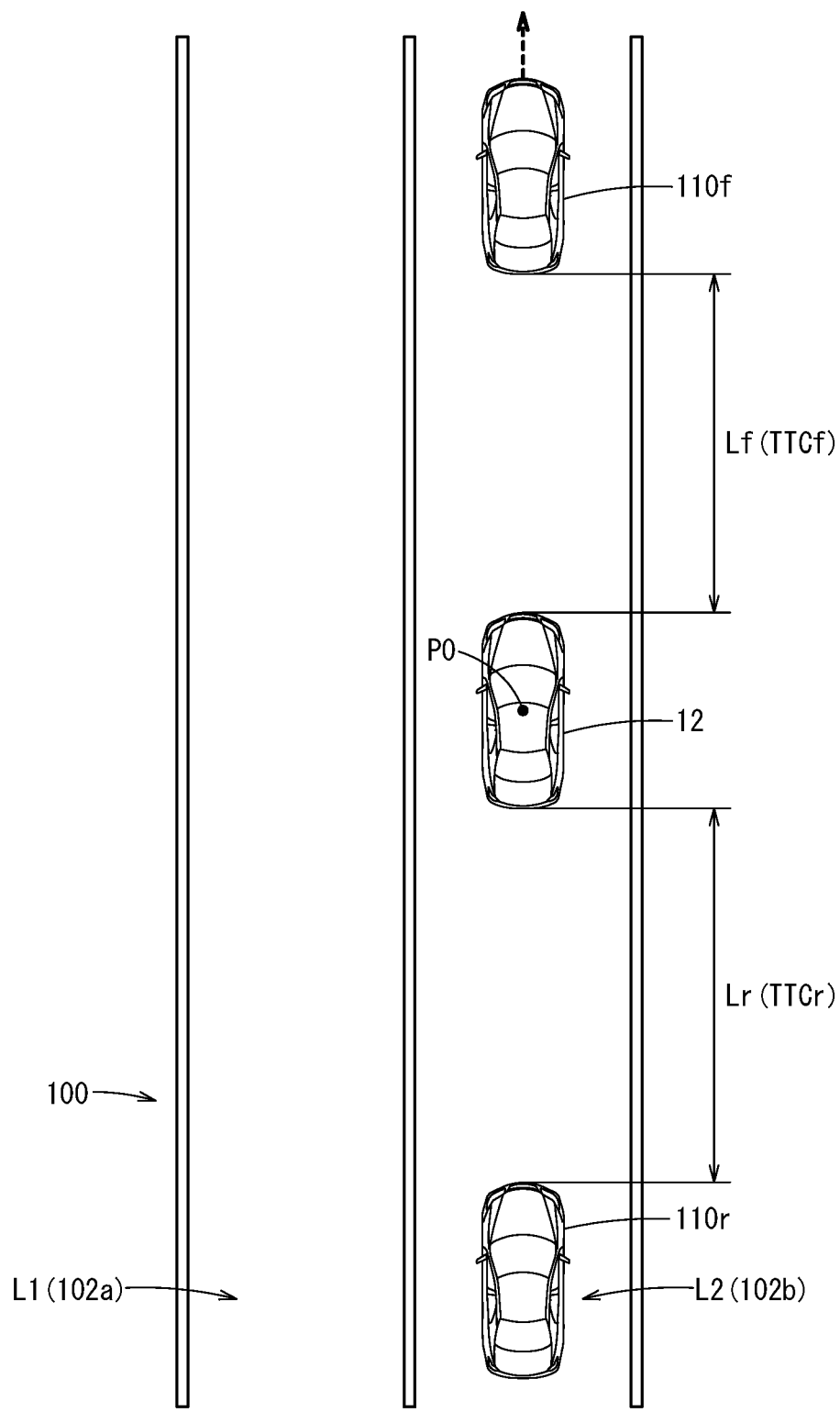
FIG. 6 is a diagram showing the traveling state of the host vehicle after making the lane change.

More specifically, in the case that both of the host vehicle lane L1 and the adjacent lane L2 are the general lanes 102b to 102d, the process proceeds to step S6. In step S6, the control condition setting unit 80 sets a first control condition for the lane change control. The first control condition is a default value (normal value) for the lane change control. As shown in FIG. 5, in the case that the host vehicle 12 is traveling in the host vehicle lane L1 and makes a lane change from the host vehicle lane L1 to the adjacent lane L2, then for example, as shown in FIG. 6, the first control condition is set in a manner so that certain marginal amounts are secured between the host vehicle 12 and the other vehicles 110f, 110r that are in front of and behind the host vehicle 12 after having made the lane change.

In this instance, the certain marginal amount implies that the time to collision TTCf with respect to the other vehicle 110f in front of the host vehicle 12 after the lane change is greater than or equal to a threshold time period Tth (TTCf≥Tth), and that the time to collision TTCr with respect to the other vehicle 110r behind the host vehicle 12 after the lane change is greater than or equal to the threshold time period Tth (TTCr≥Tth). Alternatively, the certain marginal amount implies that the inter-vehicle distance Lf with respect to the other vehicle 110f in front of the host vehicle 12 after the lane change is greater than or equal to a threshold distance Lth (Lf≥Lth), and that the inter-vehicle distance Lr with respect to the other vehicle 110r behind the host vehicle 12 after the lane change is greater than or equal to the threshold distance Lth (Lr≥Lth).

Further, in the case that the host vehicle lane L1 is the car pool lane 102a, and the adjacent lane L2 is the general lane 102b, the process proceeds to step S7. In step S7, the control condition setting unit 80 sets a second control condition for the lane change control.

In this case, the car pool lane 102a is the lane that is most distant from the exit 108. Further, in the car pool lane 102a, the traffic volume is relatively small and the average velocity is relatively high, and therefore, the inter-vehicle distance tends to be relatively long. On the other hand, in the general lanes 102b to 102d, the traffic volume is relatively large and the average velocity is relatively low, and therefore, the inter-vehicle distance tends to be relatively short. Accordingly, in the case of making a lane change from the car pool lane 102a into the general lane 102b, the lane change is carried out in a state in which a margin is not available, as compared with making a lane change between the general lanes 102b to 102d.

Thus, the control condition setting unit 80 sets the second control condition which is more lenient than the first control condition of the default value. More specifically, the second control condition implies a control parameter in which, for example, even in a situation in which the general lane 102b has a greater traffic volume than the car pool lane 102a, and is congested, whereby it is essential to make the margin smaller in comparison with the first condition, it is possible for the host vehicle 12 to make the lane change from the car pool lane 102a into the general lane 102b. Accordingly, the control condition setting unit 80 sets the second control condition having a comparatively small margin between the host vehicle 12 and the other vehicles 110f, 110r in front of and behind the host vehicle 12 in the general lane 102b.

Furthermore, in the case that the host vehicle lane L1 is the general lane 102b, and the adjacent lane L2 is the car pool lane 102a, the process proceeds to step S8. In step S8, the control condition setting unit 80 sets a third control condition for the lane change control. Normally, it is frequently the case that the lane change from the general lane 102b into the car pool lane 102a is performed immediately after having entered the freeway, and a time margin is available until reaching the exit 108. Accordingly, in comparison with making a lane change between the general lanes 102b to 102d, the lane change is made in a state in which a margin is available.

Therefore, the control condition setting unit 80 sets the third control condition which is stricter than the first control condition of the default value. More specifically, the third control condition implies a control parameter in which, for example, in a situation in which the car pool late 102a has a smaller traffic volume that the general lane 102b, and is not congested, and therefore the margin is larger in comparison with the first condition, the host vehicle 12 is allowed to change lanes from the general lane 102b into the car pool lane 102a. Accordingly, the control condition setting unit 80 sets the third control condition having a comparatively large margin between the host vehicle 12 and the other vehicles 110f, 110r in front of and behind the host vehicle 12 in the car pool lane 102a.

In this manner, the first to third control conditions are set by the control condition setting unit 80 corresponding to the type of lane change. The first to third control conditions which have been set are output to the vehicle control unit 68.

In the following step S9 (third step), in accordance with the control condition supplied from the control condition setting unit 80, the vehicle control unit 68 performs the lane change control with the lane change start position Pc serving as the starting point. Prior to such a control, the vehicle control unit 68 acquires the event content and the travel trajectory of the action plan created by the action planning unit 64.

Thereafter, the travel control unit 82 generates control signals for realizing the lane change, and outputs the respective control signals with respect to the driving force output device 40, the steering device 42, and the braking device 44. On the other hand, the notification control unit 84 generates a notification signal indicative of notification content that supports the lane change (for example, a timing instruction for the lane change), and outputs the notification signal to the notification device 46.

Consequently, as shown in FIG. 4, the host vehicle 12 starts to make the lane change at the lane change start position Pc, and carries out the lane change from the host vehicle lane L1 to the adjacent lane L2 along the planned travel route 106 indicated by the dashed line. More specifically, as shown in FIG. 5, in the case that the host vehicle 12 is traveling on a lane center line 112 of the host vehicle lane L1, from the lane change start position Pc, the host vehicle 12 is gradually made to move from the lane center line 112 to a position on the side of the adjacent lane L2. As a result, an offset amount D toward the side of the adjacent lane L2 of the host vehicle lane L1 with respect to the lane center line 112 increases along the travel direction. Then, when the host vehicle 12 has arrived at a lane change execution position Pg, the lane change from the host vehicle lane L1 to the adjacent lane L2 is executed.

Accordingly, as shown in FIG. 4, in the case that the host vehicle 12 is traveling in the car pool lane 102a, by executing the process steps sequentially in the order of steps S5→S7→S9 (see FIG. 3), the lane change is executed from the car pool lane 102a which is the host vehicle lane L1 into the general lane 102b which is the adjacent lane L2.

Next, in step S10, the lane change determining unit 78 determines whether or not the host vehicle 12 has made a lane change into the general lane 102d on the side of the exit 108. Since the lane change from the car pool lane 102a into the general lane 102b has been executed in the manner described above, the lane change determining unit 78 determines that a lane change has not been made into the general lane 102d (step S10: NO), and then the process returns to step S2.

Consequently, in the vehicle control device 10, the processes of steps S2 to S10 are executed again, and at this time, the lane change from the general lane 102b into the general lane 102c is executed. In this case, after steps S2 to S4, the process steps are executed sequentially in the order of steps S5→S6→S9, and the host vehicle 12 executes a lane change from the general lane 102b which is the host vehicle lane L1 into the general lane 102c which is the adjacent lane L2. Subsequently, in step S10, the lane change determining unit 78 determines that a lane change into the general lane 102d has not been carried out (step S10: NO), and once again, the process returns to step S2.

As a result, in the vehicle control device 10, the processes of steps S2 to S10 are executed once again, and the lane change from the general lane 102c into the general lane 102d is executed. In this case as well, after steps S2 to S4, the process steps are executed sequentially in the order of steps S5→S6→S9, and the host vehicle 12 executes a lane change from the general lane 102c which is the host vehicle lane L1 into the general lane 102d which is the adjacent lane L2.

Subsequently, in step S10, the lane change determining unit 78 determines that a lane change into the general lane 102d has been carried out (step S10: YES), and the process proceeds to the following step S11.

In step S11, since the host vehicle 12 is traveling in the general lane 102d on the side of the exit 108, the vehicle control unit 68 causes the host vehicle 12 to continue traveling to the exit 108. As a result, the host vehicle 12 passes through the exit 108 and departs from the freeway (road 100).

Moreover, in the flowchart of FIG. 3, in the case that the planned travel route 106 (see FIGS. 4 and 5) is maintained, as indicated by the dashed line, when a negative determination result is obtained in step S10 (step S10: NO), the process may be returned to step S4, and the processes of steps S4 to S10 may be executed again. Further, in the flowchart of FIG. 3, in the case of making a lane change from the general lane 102b into the car pool lane 102a, the process steps may be executed sequentially in the order of steps S5→S8→S9.

<2.3. Modification of Flowchart of FIG. 3>

In the flowchart of FIG. 3, a case has been described in which the first to third control conditions are set in consideration of a certain marginal amount in steps S6 to S8. In the vehicle control device 10 (see FIG. 1), it is also possible for the process to be executed in the manner described below.

In steps S6 to S8, the control condition setting unit 80 (see FIG. 2) may set the first to third conditions while taking into consideration a threshold value of a difference between the average velocity of the host vehicle lane L1 (see FIGS. 4 to 6) and the average velocity of the adjacent lane L2. In this case, if both the host lane L1 and the adjacent lane L2 are the general lanes 102b to 102d, and the difference in velocity is less than or equal to the threshold value, the process steps are executed sequentially in the order of steps S5→S6→S9, and the lane change control is performed by the vehicle control unit 68. Consequently, when the average velocity of the host vehicle lane L1 and the average velocity of the adjacent lane L2 are substantially the same velocity, the lane change of the host vehicle 12 is performed.

Further, in the case that among the host vehicle lane L1 or the adjacent lane L2, one of them is the car pool lane 102a, and the process steps are executed sequentially in the order of steps S5→S7→S9 or steps S5→S→S9, the vehicle control unit 68 performs the lane change control in step S9, even when the difference in velocity is in excess of the threshold value. Consequently, even if the state of the flow of traffic differs between the host vehicle lane L1 and the adjacent lane L2, it is possible for the host vehicle 12 to perform the lane change. Accordingly, in the case of making a lane change from the car pool lane 102a into the general lane 102b, the lane change is carried out in a state in which a margin is not available. Further, in the case of making a lane change from the general lane 102b into the car pool lane 102a, the lane change is carried out in a state in which a margin is available.

Furthermore, in steps S6 to S8, the control condition setting unit 80 may set the first to third control conditions in consideration of the remaining distance Ls. In this case, if traffic congestion is occurring in the vicinity of the exit 108, the control condition setting unit 80 may subtract the distance from the exit 108 to the position of the other vehicle at the end of the traffic congestion from the remaining distance Ls, and may set the first to third control conditions on the basis of the subtracted distance. Consequently, the lane change execution position Pg with respect to the host vehicle 12 is set relatively to an earlier position in front of the traffic congestion, and the lane change from the host vehicle lane L1 to the adjacent lane L2 can be executed at an early stage in consideration of the traffic congestion.

Further still, in steps S6 to S8, the control condition setting unit 80 may set the first to third control conditions in a manner so that the velocity of the host vehicle 12 is changed depending on the remaining distance Ls. Further, in steps S6 to S8, the control condition setting unit 80 may set the first to third control conditions in a manner so that the offset amount D of the host vehicle 12 from the lane center line 112 of the host vehicle lane L1 to the side of the adjacent lane L2 is changed depending on the remaining distance Ls. In either of such cases, in step S9, the vehicle control unit 68 can appropriately perform the lane change control with respect to the host vehicle 12 on the basis of the first to third control conditions.

Further, in FIG. 4, only one lane on the left side of the travel direction of the host vehicle 12 is the car pool lane 102a, however, a plurality of lanes on the left side may serve as car pool lanes 102a. In this case, when a lane change is carried out between adjacent car pool lanes 102a, then in step S5 of FIG. 3, the lane change determining unit 78 (see FIG. 2) makes a determination as to whether both of the host vehicle lane L1 and the adjacent lane L2 are car pool lanes 102a. In response to such a determination, the control condition setting unit 80 sets a new control condition on the basis of the determination result of step S5. In this case, the control condition setting unit 80 may set a new control condition for the purpose of making a lane change between the adjacent car pool lanes 102a, by way of a similar method as used with the above-described first to third control conditions.

More specifically, since it is possible for the lane change between the car pool lanes 102a to be carried out in a state in which a margin is available, the control condition setting unit 80, for example, may set the first control condition or the third control condition as the new control condition. Of course, the control condition setting unit 80 may set a condition that differs from the first to third control conditions as the new control condition for the purpose of making the lane change between the adjacent car pool lanes 102a.

As a result, in step S9, the travel control unit 82 is capable of performing the lane change of the host vehicle 12 between the adjacent car pool lanes 102a, in accordance with the new control condition set by the control condition setting unit 80.

Figure 7:
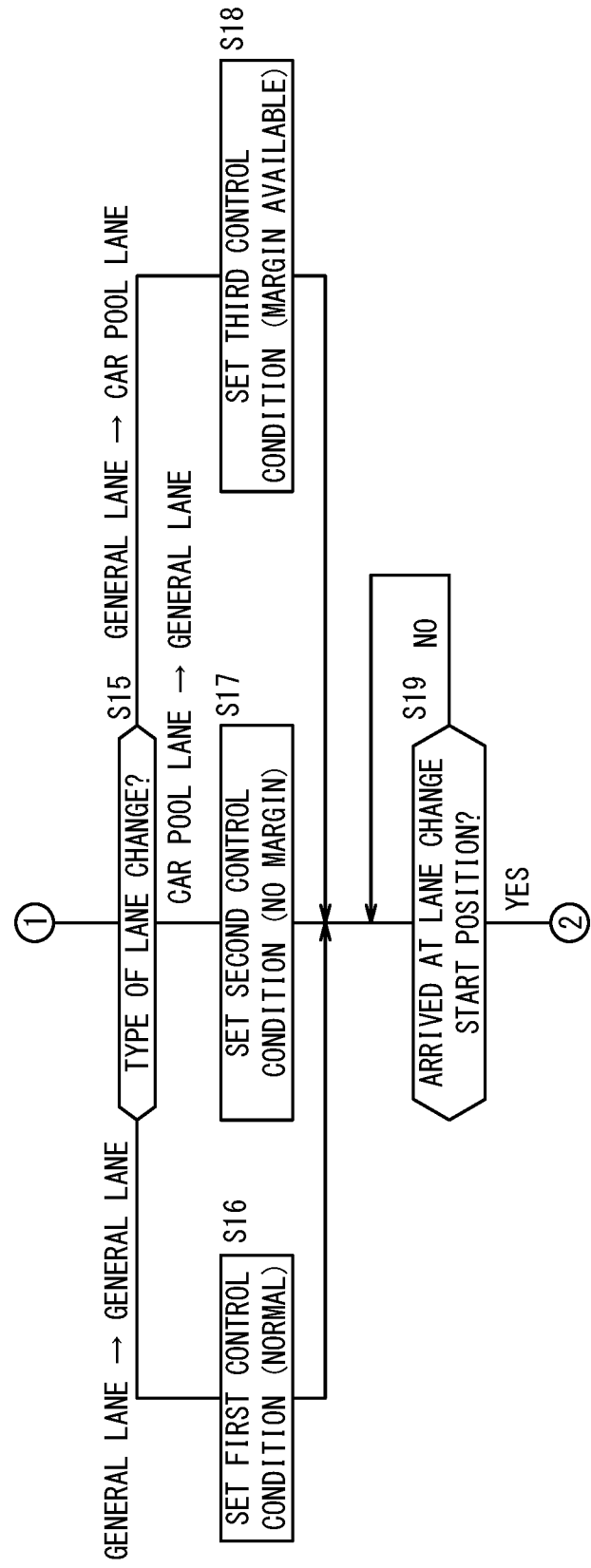
FIG. 7 is a flowchart showing a modification of FIG. 3.

Furthermore, in the flowchart of FIG. 3, the lane change control is executed in step S9 after the lane change has been permitted in step S4 (step S4: YES), the lane type has been recognized in step S5, and the first to third control conditions have been set in steps S6 to S8. In the present embodiment, as shown in FIG. 7, after step S3, the determination process of step S19 may be executed after having recognized the lane in step S15, and after having set the first to third control conditions in steps S16 to S18. Moreover, since steps S15 to S19 involve the same processes as those of steps S5 to S8 and step S4, detailed description of these steps is omitted.

Consequently, after having permitted the lane change (step S19: YES) and then proceeding to step S9 of FIG. 3, the vehicle control unit 68 (see FIG. 2) carries out the lane change control in accordance with the control condition supplied from the control condition setting unit 80.

[Effects and Advantages of Vehicle Control Device 10]

As described above, in the vehicle control device 10 and the vehicle control method, a travel control or an assist control for the host vehicle 12 is carried out on the basis of an output result from at least one device from among the periphery monitoring devices (the external environment sensors 18, the communication device 20) that monitor the periphery around the host vehicle 12, or the position specifying devices (the map information DB 22, the navigation device 24) that specify the travel position of the host vehicle 12.

In this case, the vehicle control device 10 comprises the lane recognition unit 72 that recognizes the lane types of the host vehicle lane L1 in which the host vehicle 12 is traveling and the adjacent lane L2 adjacent to the host vehicle lane L1, the control condition setting unit 80 that sets the first to third control conditions for the host vehicle 12 in order to make the lane change from the host vehicle lane L1 to the adjacent lane L2 depending on the lane types that were recognized by the lane recognition unit 72, and the vehicle control unit 68 which carries out the travel control or the assist control in relation to the lane change on the basis of the first to third control conditions set by the control condition setting unit 80.

Further, in the vehicle control method, in step S5, the lane recognition unit 72 recognizes the lane types of the host vehicle lane L1 and the adjacent lane L2, in steps S6 to S8, the control condition setting unit 80 sets the first to third control conditions depending on the lane types that were recognized, and in step S9, the vehicle control unit 68 carries out the travel control or the assist control in relation to the lane change on the basis of the first to third control conditions that were set.

In the foregoing manner, even if there is a tendency for the flow of traffic to differ in each of the lanes, the first to third control conditions for carrying out the lane change are changed depending on the lane types. Consequently, it becomes possible to smoothly perform the lane change while taking into consideration the tendency of the flow of traffic. As a result, even when the host vehicle 12 travels on a road 100 such as a freeway having a plurality of lanes, the host vehicle 12 is capable of traveling in a stable manner.

Further, the lane types include the car pool lane 102a as a specified lane in which a specified vehicle is capable of traveling in a preferential manner, and the general lanes 102b to 102d in which all vehicles can travel, and the control condition setting unit 80 sets a different control condition in the case that the host vehicle lane L1 or the adjacent lane L2 is the car pool lane 102a and the other lane is one of the general lanes 102b to 102d, and in the case that both the host vehicle lane L1 and the adjacent lane L2 are the car pool lane 102a or the general lanes 102b to 102d.

In the specified lane such as the car pool lane 102a, the traffic volume is relatively small and the average velocity is relatively high, and therefore, the inter-vehicle distance tends to be relatively long. On the other hand, in the general lanes 102b to 102d, the traffic volume is relatively large and the average velocity is relatively low, and therefore, the inter-vehicle distance tends to be relatively short. Therefore, by changing between the first to third control conditions in accordance with the difference between the car pool lane 102a and the general lanes 102b to 102d, even if the tendency of the flow of traffic differs between such lanes, the lane change can be performed smoothly.

Furthermore, the first to third control conditions include a threshold value of a difference between an average velocity in the host vehicle lane L1 and an average velocity in the adjacent lane L2. In the case that both of the host vehicle lane L1 and the adjacent lane L2 are the car pool lane 102a or one of the general lanes 102b to 102d, the vehicle control unit 68 performs the travel control or the assist control if the difference in velocity is less than or equal to the threshold value, and in the case that among the host vehicle lane L1 or the adjacent lane L2, one of them is the car pool lane 102a, the vehicle control unit 68 performs the travel control or the assist control even when the difference in velocity is in excess of the threshold value.

Accordingly, since the lane change is carried out when the difference in velocity is small between two of the car pool lanes 102a or between two of the general lanes 102b to 102d, the lane change can be performed smoothly. On the other hand, since the lane change is carried out even in the case there is a certain degree of difference in velocity between the car pool lane 102a and the general lane 102b, the lane change can be reliably executed.

Still further, on the basis of the output result of the map information DB 22 or the navigation device 24, the control condition setting unit 80 may set the first to third control conditions in consideration of the remaining distance Ls from a travel position of the host vehicle 12 to the exit 108 of the road 100 including the host vehicle lane L1 and the adjacent lane L2. In accordance with this feature, it is possible to carry out the lane change in a manner so that the host vehicle 12 can depart from the exit 108.

In this case, on the basis of the output result of the external environment sensors 18 or the communication device 20 and/or the map information DB 22 or the navigation device 24, the control condition setting unit 80 may set the first to third control conditions in consideration of the remaining distance Ls and the traffic congestion in the vicinity of the exit 108. In accordance with this feature, if traffic congestion is occurring in the vicinity of the exit 108, it is possible to carry out the lane change at an early stage.

Further, the control condition setting unit 80 may set the first to third control conditions in a manner so that the velocity of the host vehicle 12 is changed depending on the remaining distance Ls when the lane change occurs. In accordance with this feature, in the case that the remaining distance Ls is long, since there is a margin available until the host vehicle 12 reaches the exit 108, the host vehicle 12 can be gradually decelerated and then execute the lane change. On the other hand, in the case that the remaining distance Ls is short, since sufficient margin is not available for the host vehicle 12 to reach the exit 108, the host vehicle 12 can be rapidly decelerated and then execute the lane change.

Furthermore, the control condition setting unit 80 may set the first to third control conditions in a manner so that the offset amount D of the host vehicle 12 from the center position (the position of the lane center line 112) of the host vehicle lane L1 to the side of the adjacent lane L2 is changed depending on the remaining distance Ls when the lane change occurs. In accordance with this feature, it is possible to shorten the time required for the lane change.

Further still, the control condition setting unit 80 may set the second control condition in a manner so that, when the host vehicle 12 performs a lane change from the car pool lane 102a into the general lane 102b, a certain marginal amount (time to collision TTCf, TTCr, inter-vehicle distance Lf, Lr) is secured between the host vehicle 12 and the other vehicles 110f, 110r in front of and behind the host vehicle 12 in the general lane 102b. In accordance with this feature, the lane change can be executed in a state in which it is assured that there is the inter-vehicle distance Lf, Lr or the time to collision TTCf, TTCr with the other vehicles 110f, 110r traveling in the general lane 102b in front of and behind the host vehicle 12.

The vehicle control device 10 may further comprise the lane change determining unit 78 which permits the lane change. In this case, after the lane change determining unit 78 has permitted the lane change, recognition of the lane types by the lane recognition unit 72, setting of the first to third control conditions by the control condition setting unit 80, and the travel control or the assist control by the vehicle control unit 68 may be sequentially carried out. Alternatively, after recognition of the lane types by the lane recognition unit 72, and setting of the first to third control conditions by the control condition setting unit 80 are sequentially carried out, and the lane change determining unit 78 has permitted the lane change, the vehicle control unit 68 may carry out the travel control or the assist control. In either of such cases, the lane change can be performed smoothly and appropriately.

The present invention is not limited to the embodiment described above, and it goes without saying that the present invention can be freely modified within a range that does not depart from the essence and gist of the present invention. Alternatively, the respective configurations may be combined arbitrarily within a range in which no technical inconsistencies occur.

What is claimed is:

1. A vehicle control device adapted to carry out a travel control or an assist control for a host vehicle, on the basis of an output result from at least one device from among a periphery monitoring device that monitors the periphery around the host vehicle, or a position specifying device that specifies a travel position of the host vehicle, the vehicle control device comprising:

an action planning unit adapted to create action plans based on recognition results from the periphery monitoring device and the position specifying device;

a lane recognition unit adapted to recognize a respective lane type for each lane of a plurality of lanes of a road, the respective lane type being one of a general lane type and a specified lane type in which a specified vehicle is capable of traveling in a preferential manner, the plurality of lanes of the road include a first lane connected to an exit of a road and recognized to have the general lane type, one or more second lanes adjacent to the first lane and recognized to have the general lane type, and a specified lane separated from the first lane by the one or more second lanes and recognized to have the specified lane type, wherein a host vehicle lane is one of the plurality of lanes of the road in which a host vehicle is traveling and an adjacent lane is one of the plurality of lanes of the road adjacent to the host vehicle lane;

a control condition setting unit adapted to set a control condition for the host vehicle in order to make a lane change from the host vehicle lane to the adjacent lane depending on the recognized respective lane type; and a vehicle control unit adapted to carry out a travel control or an assist control in relation to the lane change of the host vehicle on the basis of the control condition set by the control condition setting unit, in a case where a planned travel route to the exit is set and the host vehicle lane is the specified lane, the control condition setting unit sets the control condition to be more lenient in a situation where sufficient time or distance is not available for the host vehicle to reach the exit, compared to a situation where there is time or distance available until the host vehicle reaches the exit.

2. The vehicle control device according to claim 1, wherein:
the control condition includes a threshold value of a difference between an average velocity of the host vehicle lane and an average velocity of the adjacent lane;
in the case that both of the host vehicle lane and the adjacent lane are the specified lane type or the general lane type, the vehicle control unit performs the travel control or the assist control if the difference is less than or equal to the threshold value; and
in the case that among the host vehicle lane or the adjacent lane, only one of them is the specified lane type, the vehicle control unit performs the travel control or the assist control even when the difference is in excess of the threshold value.

3. The vehicle control device according to claim 1, wherein the control condition setting unit sets the control condition to be more lenient as a remaining distance from a travel position of the host vehicle to the exit of the road is shorter.

4. The vehicle control device according to claim 3, wherein the control condition setting unit sets a lane change start position on the planned travel route to an earlier position for the host vehicle when the remaining distance is short and traffic congestion in the vicinity of the exit is occurring.

5. The vehicle control device according to claim 3, wherein the control condition setting unit sets the control condition in a manner so that the velocity of the host vehicle is rapidly decreased as the remaining distance is shorter.

6. The vehicle control device according to claim 3, wherein the control condition setting unit sets the control condition in a manner so that an offset amount of the host vehicle from a center position of the host vehicle lane to a side of the adjacent lane is increased as the remaining distance is shorter.

7. The vehicle control device according to claim 1, wherein the control condition setting unit sets the control condition in a manner so that, when the host vehicle performs a lane change from the specified lane into the first lane or the one or more second lanes, an inter-vehicle distance or a marginal time to collision between the host vehicle and another vehicle in front of or behind the host vehicle is reduced as the remaining distance is shorter.

8. The vehicle control device according to claim 1, further comprising:
a lane change determining unit adapted to permit the lane change;
wherein, after the lane change determining unit has permitted the lane change, recognition of the respective lane type by the lane recognition unit, setting of the control condition by the control condition setting unit, and the travel control or the assist control by the vehicle control unit are sequentially carried out.

9. A vehicle control method adapted to carry out a travel control or an assist control for a host vehicle, on the basis of an output result from at least one device from among a periphery monitoring device that monitors the periphery around the host vehicle, or a position specifying device that specifies a travel position of the host vehicle, the vehicle control method comprising:
a first step in which a lane recognition unit recognizes a respective lane type for each lane of a plurality of lanes of a road, the respective lane type being one of a general lane type and a specified lane type in which a specified vehicle is capable of traveling in a preferential manner, the plurality of lanes of the road include a first lane connected to an exit of a road and recognized to have the general lane type, one or more second lanes adjacent to the first lane and recognized to have the general lane type, and a specified lane separated from the first lane by the one or more second lanes and recognized to have the specified lane type, wherein a host vehicle lane is one of the plurality of lanes of the road in which the host vehicle is traveling and an adjacent lane is one of the plurality of lanes of the road adjacent to the host vehicle lane;
a second step in which a control condition setting unit sets a control condition for the host vehicle in order to make a lane change from the host vehicle lane to the adjacent lane depending on the respective lane type that was recognized by the lane recognition unit, in a case where a planned travel route to the exit is set based on recognition results from the periphery monitoring device and the position specifying device and the host vehicle lane is the specified lane type, the control condition being more lenient in a situation where sufficient time or distance is not available for the host vehicle to reach the exit, compared to a situation where there is time or distance available until the host vehicle reaches the exit; and
a third step in which a vehicle control unit carries out a travel control or an assist control in relation to the lane change of the host vehicle on the basis of the control condition set by the control condition setting unit.

10. The vehicle control device according to claim 1, further comprising:
a lane change determining unit adapted to permit the lane change;
wherein after recognition of the respective lane type by the lane recognition unit, and setting of the control condition by the control condition setting unit are sequentially carried out, and the lane change determining unit has permitted the lane change, the vehicle control unit carries out the travel control or the assist control.

11. The vehicle control device according to claim 1, the control condition setting unit sets the control condition to be more lenient as a number of lanes between the host vehicle lane and the first lane increases.

* * * * *